United States Patent
Nishida

(10) Patent No.: US 8,306,401 B2
(45) Date of Patent: Nov. 6, 2012

(54) OPTICAL DISC DEVICE WITH INTEGRATED HARD DISK DRIVE

(75) Inventor: Yusuke Nishida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1284 days.

(21) Appl. No.: 11/702,640

(22) Filed: Feb. 6, 2007

(65) Prior Publication Data
US 2007/0183748 A1    Aug. 9, 2007

(30) Foreign Application Priority Data

Feb. 7, 2006    (JP) .................................. 2006-029706

(51) Int. Cl.
*H04N 5/76* (2006.01)
(52) U.S. Cl. ........................................ 386/298; 386/291
(58) Field of Classification Search .................... 386/94, 386/125
See application file for complete search history.

(56) References Cited

U.S. PATENT DOCUMENTS

| | | | | |
|---|---|---|---|---|
| 2001/0012440 A1* | 8/2001 | Itoi | ................................ | 386/94 |
| 2003/0219230 A1* | 11/2003 | Kato | ................................ | 386/94 |
| 2007/0217762 A1* | 9/2007 | Yahata | ................................ | 386/94 |

FOREIGN PATENT DOCUMENTS

| | | |
|---|---|---|
| EP | 1 246 463 A2 | 10/2002 |
| JP | A-2003-317377 | 11/2003 |

OTHER PUBLICATIONS

Drawings for Japanese Application Publication 2003-317377.*
English Translation of Abstract and Detailed Description for Japanese Application Publication 2003-317377.*

* cited by examiner

*Primary Examiner* — William C Vaughn, Jr.
*Assistant Examiner* — Eileen Adams
(74) *Attorney, Agent, or Firm* — Morgan, Lewis & Bockius LLP

(57) ABSTRACT

Optical disc device with integrated hard disk drive includes HDD recording and reproducing portion, DVD recording and reproducing portion, and record restriction process portion that decides whether DVD is disc supporting CPRM and discriminates copy protection information of television broadcasting signal. If "copy once" signal is detected from the copy protection information when it is started to record contents of television broadcasting on DVD that does not support CPRM, recording by hard disk drive is performed instead of recording on DVD. If "copy free" signal is detected from copy protection information while contents are recorded by HDD, recording by hard disk drive is stopped, and recording on DVD is performed. If "copy once" signal is detected from copy protection information while contents are recorded on DVD, recording on DVD is stopped, and recording by HDD is performed.

3 Claims, 2 Drawing Sheets

OPTICAL DISC DEVICE WITH INTEGRATED HARD DISK DRIVE

This application is based on Japanese Patent Application No. 2006-029706 filed on Feb. 7, 2006, the contents of which are hereby incorporated by reference.

BACKGROUND OF THE INVENTION

1. Field of the Invention

The present invention relates to an optical disc device with an integrated hard disk drive including a hard disk drive (hereinafter referred to as an HDD) that is capable of recording pictures and an optical disc device that is capable of recording pictures.

2. Description of Related Art

Recently, an optical disc device utilizing a digital versatile disc (DVD) or the like or a hard disk recorder is used for recording contents of television broadcasting at home. In particular, an optical disc device with an integrated hard disk drive has appeared in the market. The device includes an optical disc device utilizing a DVD or the like and a hard disk recorder housed in a single case.

For securing copyright, television broadcasting contains copy protection information. There are three types of the copy protection information, and a first one is "copy free". This means that the contents can be duplicated unlimited number of times, i.e., it can be duplicated freely. A second one is "copy once", which means that the contents can be duplicated only once. A third one is "copy never", which means that the contents can never be duplicated.

When television broadcasting is recorded on a DVD, the above mentioned copy protection information may become a problem. It is because that a usual optical disc device does not incorporate CPRM (content protection for recordable media) that is a technique for preventing illegal copy of DVD contents when a recording reservation is made. Therefore, if the DVD loaded in the device does not support CPRM, the recording reservation may be made although the recording cannot be performed actually.

For example, a DVD-RAM, a DVD-RW (version 2.0) and DVD-R can support CPRM among recordable DVDs, so contents of "copy once" can be recorded on them in a form that cannot be duplicated to other DVD family. In contrast, a DVD-RW (version1.0) does not support CPRM, so contents of "copy once" cannot be recorded on it.

Therefore, there is a problem that a user may feel inconvenience of handling if the user is forced to do a complicated operation with awareness of the copy protection information for each contents to be recorded.

JP-A-2003-317377 discloses a recording device in which a record restriction process portion performs a process of recording data not on a removable recording medium but on an unremovable recording medium if the data are contents of "copy once" and the removable recording medium does not support the technique for preventing illegal copy in the recording device that can use a plurality of types of recording media including the removable one and the unremovable one.

According to the recording device disclosed in the above mentioned JP-A-2003-317377, failure of recording data that is reserved to be recorded by a timer can be prevented when the recording starts. However, the document does not describe what operation will be performed if the copy protection information is changed to "copy once" while data whose copy protection information is "copy free" are being recorded on a DVD that does not support CPRM. In this case, since the data of "copy once" are not permitted to be recorded on the DVD that does not support CPRM, the recording device will stop the recording. As a result, the recording of the contents will be failed.

SUMMARY OF THE INVENTION

In view of the above described problem, it is an object of the present invention to provide an optical disc device with an integrated hard disk drive that does not fail in recording data even if copy protection information is changed while the data are being recorded.

To attain the above described object, an optical disc device with an integrated hard disk drive in accordance with one aspect of the present invention includes: a hard disk drive recording and reproducing portion for recording and reproducing contents; an optical disc recording and reproducing portion for recording and reproducing contents; and a record restriction process portion that decides whether or not a optical disc is a disc supporting illegal copy prevention and discriminates copy protection information of a television broadcasting signal. And the optical disc device with an integrated hard disk drive is characterized by a structure in which if a "copy once" signal is detected from the copy protection information while contents of television broadcasting are recorded on an optical disc that does not support illegal copy prevention, recording on the optical disc is stopped, and recording by the hard disk drive is performed.

According to this structure, when the "copy once" signal is detected, the recording process is continued without interruption from recording on the optical disc to recording by the hard disk drive.

In addition, the present invention is characterized by a structure in which if a "copy free" signal is detected from the copy protection information while the recording by the hard disk drive is being performed, the recording by the hard disk drive is stopped and recording on the optical disc is performed.

According to this structure, when the "copy free" signal is detected, the recording process is continued without interruption from recording by the hard disk drive to recording on the optical disc.

In addition, the present invention is characterized by a structure in which if a "copy once" signal is detected from the copy protection information when it is started to record contents of television broadcasting on an optical disc that does not support preventing illegal copy, recording by the hard disk drive is performed instead of recording on the optical disc.

According to this structure, a situation that the contents cannot be recorded is avoided, and the contents can be recorded by the hard disk drive.

To attain the above described object, an optical disc device with an integrated hard disk drive in accordance with another aspect of the present invention includes: a hard disk drive recording and reproducing portion for recording and reproducing contents; a DVD recording and reproducing portion for recording and reproducing contents; and a record restriction process portion that decides whether or not a DVD is a disc supporting CPRM and discriminates copy protection information of a television broadcasting signal. And the optical disc device with an integrated hard disk drive is characterized by a structure in which if a "copy once" signal is detected from the copy protection information when it is started to record contents of television broadcasting on a DVD that does not support CPRM, recording by the hard disk drive is performed instead of recording on the DVD, and the optical disc device with an integrated hard disk drive is characterized by a structure in which if a "copy free" signal is detected from the copy protection information while the contents are recorded by the hard disk drive, recording by the hard disk drive is stopped, and recording on the DVD is performed, and if the "copy once" signal is detected from the copy protection information while the contents are recorded on the DVD, recording on the DVD is stopped, and recording by the hard disk drive is performed.

According to the present invention, if the "copy once" signal is detected from the copy protection information while contents of television broadcasting are recorded on an optical disc that does not support preventing illegal copy, the recording on the optical disc is stopped, and recording by the hard disk drive is performed instead. Thus, even if copy protection information changes during the recording process, recording failure does not happen.

In addition, according to the present invention, if the "copy free" signal is detected from the copy protection information during the recording process by the hard disk drive, the recording process by the hard disk drive is stopped, and recording on an optical disc is performed instead. Thus, the contents can be recorded on an optical disc device as much as possible.

In addition, according to the present invention, if the "copy once" signal is detected from the copy protection information when it is started to record on an optical disc that does not support preventing illegal copy, recording by the hard disk drive is performed instead of recording on the optical disc. Thus, a situation that the contents cannot be recorded is avoided, and recording failure does not happen.

DESCRIPTION OF THE PREFERRED EMBODIMENTS

Figure 1:
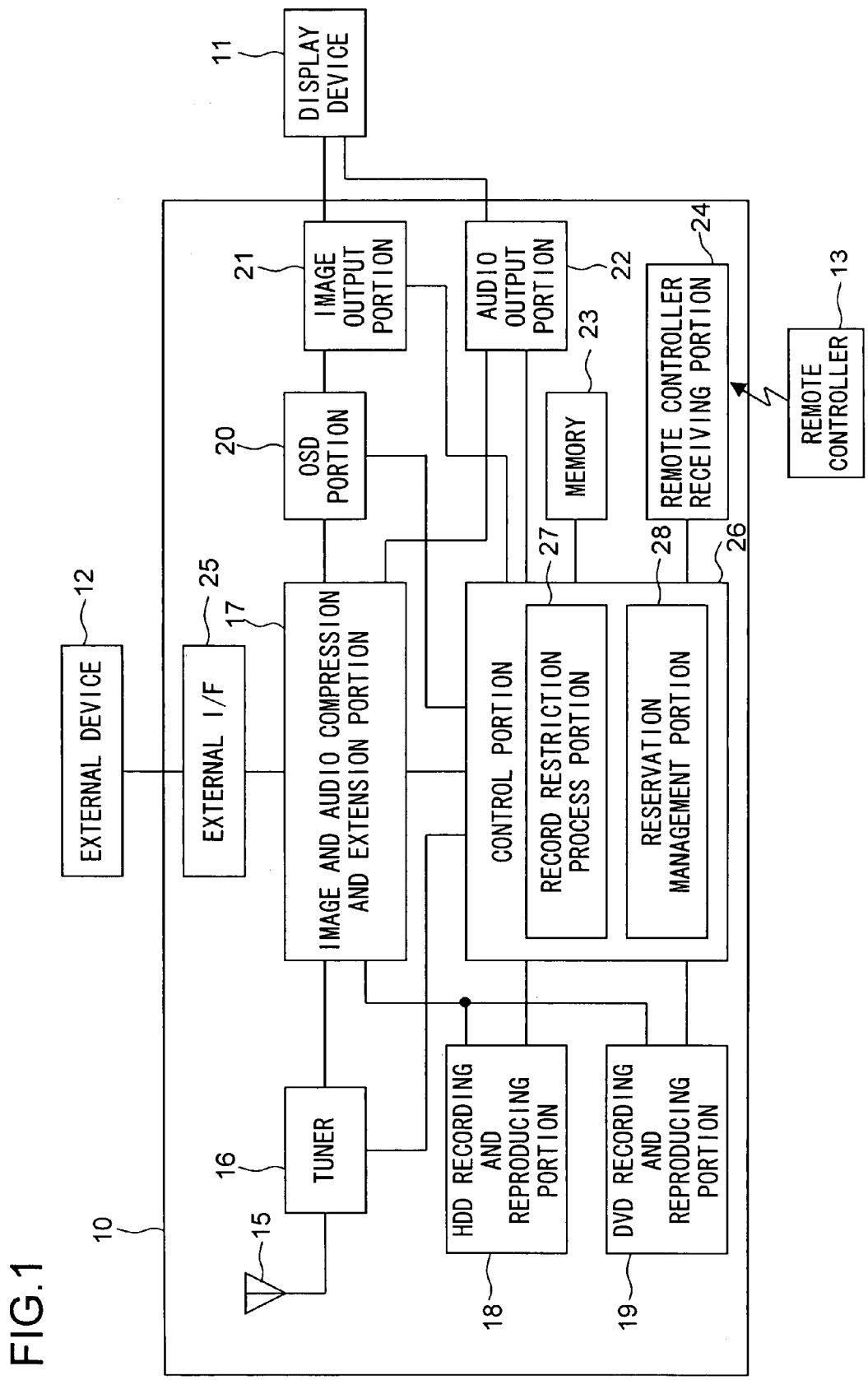
FIG. 1 is a block diagram to show a structure of an optical disc device with an integrated HDD and its peripheral equipment according to the present invention.

FIG. 1 is a block diagram to show a structure of an optical disc device with an integrated hard disk drive and its peripheral equipment according to the present invention. The optical disc device with an integrated HDD 10 is connected to a display device 11 such as a television set and an external device 12 such as a video deck. In addition, the optical disc device with an integrated HDD 10 can be operated by using a remote controller 13. In the following description, a DVD is exemplified as an optical disc.

The optical disc device with an integrated HDD 10 is equipped with an antenna 15 for receiving a television broadcasting signal, a tuner 16 for demodulating and digitizing the television broadcasting signal received by the antenna 15, an image and audio compression and extension portion 17 for compression coding the image and audio data received from the tuner 16 based on MPEG-2 or the like and for extension decoding the compressed image data reproduced by an HDD recording and reproducing portion 18 or a DVD recording and reproducing portion 19, the HDD recording and reproducing portion 18 for recording the compressed image and audio data received from the image and audio compression and extension portion 17 and for reproducing the recorded data, the DVD recording and reproducing portion 19 for recording the compressed image and audio data received from the image and audio compression and extension portion 17 on a loaded DVD and for reproducing data recorded on the DVD, an on-screen display (OSD) portion 20 for enabling each type of set value to be set while it is displayed on a part of the display device 11, an image output portion 21 for converting the image signal from the OSD portion 20 into an analog signal and for outputting the same to the display device 11, an audio output portion 22 for converting the audio signal from the image and audio compression and extension portion 17 into an analog signal and for outputting the same to the display device, a memory 23 made up of a ROM and RAM, a remote controller receiving portion 24 for receiving a signal from the remote controller 13, an external I/F 25 to which the external device 12 is connected, and a control portion 26 for controlling each portion of the optical disc device with an integrated HDD 10.

In addition, the control portion 26 is equipped with a record restriction process portion 27 for deciding whether or not a loaded DVD is a disc supporting CPRM that is a technique for preventing illegal copy and determining copy protection information of the television broadcasting signal, and a reservation management portion 28 for managing reservation of recording contents of television broadcasting.

A recording operation of the above mentioned optical disc device with an integrated HDD 10 when a user instructs recording by the HDD or recording on a DVD will be described. The television broadcasting signal received by the antenna 15 is demodulated and digitized by the tuner 16, and the image and audio data is sent to the image and audio compression and extension portion 17. The image and audio compression and extension portion 17 compresses and encodes the image and audio data based on MPEG-2 or the like and sends the data to the designated HDD recording and reproducing portion 18 or DVD recording and reproducing portion 19. In the case of the HDD recording and reproducing portion 18, the compressed image and audio data are stored on a hard disk. In the case of the DVD recording and reproducing portion 19, the compressed image and audio data are stored on a DVD.

In the optical disc device with an integrated HDD 10 described above, when the user designates recording by the HDD, the control portion 26 starts the recording by the HDD as receiving an instruction to start recording. The instruction to start recording is issued in two cases. One is the case where the instruction to start recording is issued when the start time of recording reservation managed by the reservation management portion 28 has come. The other is the case where the remote controller 13 or a control panel (not shown) of the optical disc device with an integrated HDD 10 is operated by the user to instruct real time recording.

Then, the control portion 26 stops the recording by the HDD when it receives an instruction to stop recording. The instruction to stop recording is issued in two cases. One is the case where the end time of the recording of reservation managed by the reservation management portion 28 has come. The other is the case where the remote controller 13 or a control panel (not shown) of the optical disc device with an integrated HDD 10 is operated by the user to issue the instruction to stop recording in real time.

Figure 2:
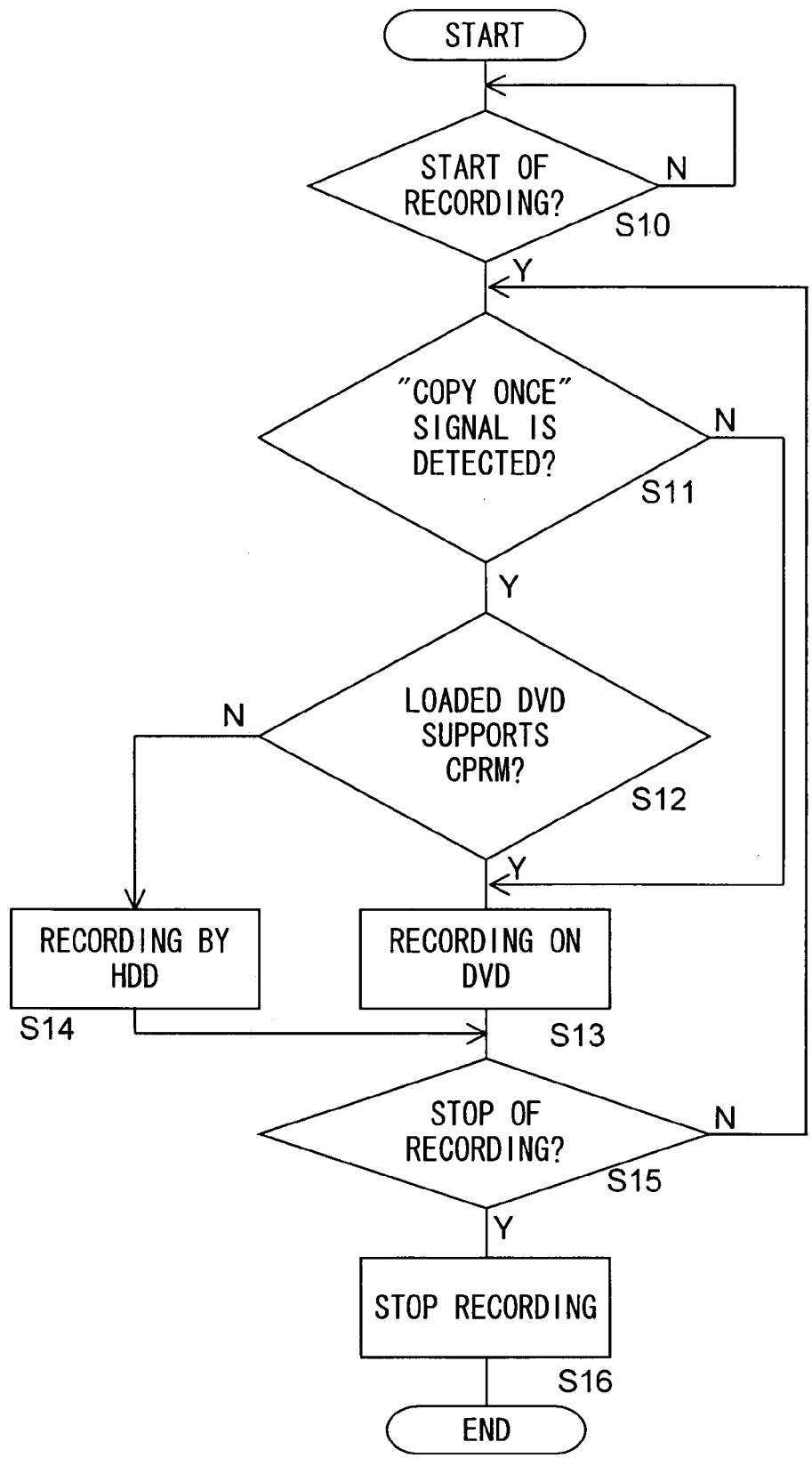
FIG. 2 is a flowchart to show a recording operation of the optical disc device with an integrated HDD of the present invention when recording on a DVD is designated.

Next, a recording operation of the above mentioned optical disc device with an integrated HDD 10 when the user instructs recording on a DVD will be described. FIG. 2 is a flowchart to show the recording operation of the above mentioned optical disc device with an integrated HDD 10 when recording on a DVD is designated. First, in the step S10 the control portion 26 decides whether or not start of recording is instructed. The instruction to start recording is issued in two cases. One is the case where the instruction to start recording is issued when the start time of recording reservation managed by the reservation management portion 28 has come. The other is the case where the remote controller 13 or a control panel (not shown) of the optical disc device with an integrated HDD 10 is operated by the user to instruct real time recording.

If it is decided that the instruction to start recording is issued in the step S10, the process goes to the step S11 in which a desired television broadcasting signal is received, and the record restriction process portion 27 discriminates copy protection information in the signal. As a result of the discrimination in the step S11, if a "copy once" signal is detected, the process goes to the step S12 in which it is decided whether or not the loaded DVD is a disc supporting CPRM because the broadcasting signal cannot be recorded on a disc that does not support CPRM. As a result of the decision in the step S12, if it is decided that the DVD is a disc supporting CPRM, the process goes to the step S13 in which recording on a DVD is started. In contrast, it is decided that the DVD is a disc that does not support CPRM as a result of the decision in the step S12, the process goes to the step S14 in which recording by the HDD is started instead of recording on a DVD.

In addition, if a "copy free" signal is detected as a result of discrimination in the step S1, the process goes to the step S13 in which recording on a DVD is started because the broadcasting signal can be recorded even on a disc that does not support CPRM.

When the recording on a DVD or the recording by the HDD is started, the process goes to the step S15 from the step S13 or S14, and it is decided whether or not stop of recording is instructed. The instruction to stop recording is issued in two cases. One is the case where the end time of the recording of reservation managed by the reservation management portion 28 has come. The other is the case where the remote controller 13 or a control panel (not shown) of the optical disc device with an integrated HDD 10 is operated by the user to issue the instruction to stop recording in real time.

Then, if it is decided in the step S15 that instruction to stop recording is issued, the process goes to the step S16 in which recording on a DVD or recording by the HDD is stopped so that the recording operation is finished. In contrast, if it is decided in the step S15 that the instruction to stop recording is not issued, the process goes back to the step S11. Then, the process from the step S11 to the step S15 is repeated until the instruction to stop recording is issued while recording is performed with changing from the HDD to the DVD or from the DVD to the HDD as a recording destination if necessary.

Furthermore, if a "copy never" signal is detected from the copy protection information in the step S11, the recording is stopped.

Next, the case where the loaded DVD is a disc that does not support CPRM in the recording operation shown in FIG. 2 will be described. If it is decided in the step S10 that the instruction to start recording is issued, the process goes to the step S11 in which the copy protection information of the desired television broadcasting signal is discriminated. If the "copy once" signal is detected, the process goes to the step S12 in which it is decided that the disc does not support CPRM. Then, the process goes to the step S14 in which recording by the HDD is started.

When the recording by the HDD is started, the process goes from the step S14 to the step S15 in which it is decided whether or not stop of recording is instructed. If it is decided that the instruction to stop recording is not issued, the process goes back to the step S11 in which the copy protection information is discriminated again. If a "copy free" signal is detected in the step S11, it means that it is possible to record even on a disc that does not support CPRM. Therefore, the process goes to the step S13 in which recording by the HDD is stopped, and recording on a DVD is started.

Then, the process goes back to the step S11 again via the step S15, and the copy protection information is discriminated. If the "copy once" signal is detected again, the process goes via the step S12 to the step S14 in which recording on a DVD is stopped, and recording by the HDD is started.

As described above, even if the user designates recording on a DVD, recording by the HDD is performed instead of recording on a DVD in the case where the loaded DVD is a disc that does not support CPRM and where a "copy once" signal is detected. If a "copy free" signal is detected, recording on a DVD is performed. Thus, the DVD and the HDD are exchanged to each other as recording destination if necessary during recording. As a result, even if copy protection information changes during recording, a failure in recording can be avoided.

The present invention can be applied to an optical disc device with an integrated HDD that is equipped with a recordable hard disk drive and a recordable optical disc device, and e.g., to a DVD device with an integrated HDD.

What is claimed is:

1. An optical disc device with an integrated hard disk drive, comprising:
   a hard disk drive recording and reproducing portion for recording and reproducing contents;
   an optical disc recording and reproducing portion for recording and reproducing contents; and
   a record restriction process portion that decides whether or not a optical disc is a disc supporting illegal copy prevention and discriminates copy protection information of a television broadcasting signal, wherein
   only when a "copy once" signal is detected from the copy protection information while contents of television broadcasting are recorded on an optical disc that does not support illegal copy prevention, recording on the optical disc is stopped, and recording by the hard disk drive is performed, wherein
   only when a "copy free" signal is detected from the copy protection information while the contents are recorded by the hard disk drive, recording by the hard disk drive is stopped, and recording on the optical disc is performed.

2. The optical disc device with an integrated hard disk drive according to claim 1, wherein if the "copy once" signal is detected from the copy protection information when it is started to record the contents of television broadcasting on an optical disc that does not support illegal copy prevention, recording by the hard disk drive is performed instead of recording on the optical disc.

3. An optical disc device with an integrated hard disk drive, comprising:
   a hard disk drive recording and reproducing portion for recording and reproducing contents;

a DVD recording and reproducing portion for recording and reproducing contents; and a record restriction process portion that decides whether or not a DVD is a disc supporting CPRM and discriminates copy protection information of a television broadcasting signal, wherein only when a "copy once" signal is detected from the copy protection information when it is started to record contents of television broadcasting on a DVD that does not support CPRM, recording by the hard disk drive is performed instead of recording on the DVD, and only when a "copy free" signal is detected from the copy protection information while the contents are recorded by the hard disk drive, recording by the hard disk drive is stopped, and recording on the DVD is performed, and only when the "copy once" signal is detected from the copy protection information while the contents are recorded on the DVD, recording on the DVD is stopped, and recording by the hard disk drive is performed.

* * * * *